United States Patent Office 3,781,423
Patented Dec. 25, 1973

3,781,423
METHOD FOR PREVENTING COLORING OF VITAMIN C
Katsuo Aoka, Nishinomiya, Kozo Yatani, Hikari, Eishi Kometani, Ibaraki, and Seiji Izuhara, Osaka, Japan, assignors to Takeda Chemical Industries, Ltd., Higashi-ku, Osaka, Japan,
No Drawing. Filed Jan. 14, 1969, Ser. No. 791,192
Claims priority, application Japan, Jan. 18, 1968, 43/2,813
Int. Cl. A61k 15/00
U.S. Cl. 424—175
23 Claims

ABSTRACT OF THE DISCLOSURE

Coloring of vitamin C compositions is prevented by incorporating an effective amount, as an anti-coloring agent, of a mercaptopropionylglycine of the formula:

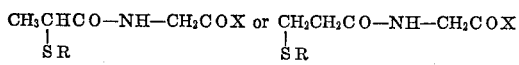

wherein R stands for H, acetyl or benzoyl and X for —OH or —NH$_2$, or a mixture of more than one of them, into a composition containing vitamin C.

---

This invention relates to a metthod for preventing coloring of vitamin C, and also to a vitamin C-containing composition thus stabilized in color.

It is well known that, whether being in the free form or as a water soluble salt such as a sodium salt, vitamin C as such or in tn aqueous solution undergoes coloring on standing. For example, vitamin C tablets or an aqueous vitamin C injection becomes colored in the course of processing or prolonged storage. This phenomenon of coloring has been a serious drawback particularly in an aqueous preparation containing vitamin C.

The coloring is generally apt to develop more extensively as the contents or concentration of vitamin C increases or with increasing amounts of impurities such as oxygen or heavy metals such as copper or iron, which may be present in the materials to be incorporated into such a composition. It is particularly accelerated on exposure to heat, light or air, whether alkaline or acid conditions. It may therefore be reasonably expected that such measures as exhaustive purification of the materials, shoulding of the composition from heat, light and air, or a proper pH adjustment will contribute to the prevention of coloring. However, these measures are troublesome or difficult to be followed in some cases, and even if they are duly followed it is still difficult to keep the vitamin C composition intact from coloring.

To avoid said difficulties there has been proposed the use of such anticoloring agents as sodium bisulfite, thioglycolic acid, cysteine and thioctic acid, but they are still not enough to prevent the coloring satisfactorily. In view of the coloring-preventing effect, thioglycolic acid seems to surpass any other known anticoloring agents, but it has fairly high toxicity in itself.

Therefore, the principal object of the present invention is to provide a method of preventing coloring of vitamin C containing composition in simple procedures without giving any hazard to the intended effect and applicability of the vitamin C composition.

Another object of this invention is to provide a vitamin C-containing composition which is stabilized against the coloring, even at a rather high concentration of vitamin C in the composition.

Further objects will become apparent from the description as shown below.

Said principal object is realized by incorporating, as an anticoloring agent, one or more of the mercaptopropionylglycine compounds (MPG compounds) of the formulas:

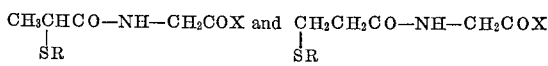

wherein R stands for any of H, acetyl and benzoyl, and X stands for any of OH and NH$_2$, into a composition containing vitamin C.

It is to be noted that the term "vitamin C" in this specification as well as in claims is employed as including its salt with, for example, an alkali metal such as sodium or potassium. Among the so-defined "vitamin C," the free acid and its water-soluble salts give the most extensive coloring. Nevertheless, it is satisfactorily suppressed and prevented by the method of the present invention.

The method of the present invention is applicable to any type of vitamin C compositions as exemplified by injections, other solutions for internal or external use, suspensions, emulsions, pastes, aerosols, tinctures, elixirs, tablets and powders.

Said mercaptopropionylglycine compounds are prepared, for example, according to the manner as described in U.S. Pat. No. 3,246,025, and are exemplified by the following (respective compounds may be abbreviated as shown in the parentheses in this specification):

α-mercaptopropionylglycine (α-MPG);
β-mercaptopropionylglycine (β-MPG);
α-mercaptopropionylglycineamide (α-MPGM);
β-mercaptopropionylglycineamide (β-MPGM);
α-acetylthiomercaptopropionylglycine α-AcMPG);
α-benzoylthiomercaptopropionylglycine (α-ByMPG).

These mercaptopropionylglycine compounds, as far as they have a carboxyl or a mercapto group may be used as a salt with an alkali metal such as sodium or potassium or with ammonium or an amine such as mono-, di- or triethanolamine, on the same molar basis as the free compounds.

The anticoloring agents, the MPG compounds have the advantage that each possesses a strong tendency to inhibit the coloring of vitamin C, particularly in an aqueous solution, despite of its eminently low toxicity and attains the desired anticoloring effect even in such a low concentration as to show no intrinsic pharmacological effect.

The effective amount as the anticoloring agents may vary in minor degrees upon the concentration of vitamin C in said composition or upon the type and concentration of any other ingredients incorporated into the composition, as well as the specific compound to be used as the anticoloring agent. However, in general, use may be made to show the anticoloring effect of the MPG compounds in a concentration of about 0.001% or higher, particularly 0.05% or higher, by weight relative to the whole amount of the vitamin C composition and in a concentration of about 0.1% or higher, particularly 0.4% or higher, by weight relative to the vitamin C contained in the composition.

Too much amount is of no use for preventing the coloring of vitamin C, and it is usually chosen from the range lower than about 10% by weight of the whole composition and lower than about 200%, usually lower than about 20%, by weight of the vitamin C contained. It is noteworthy that each of the MPG compound gives quite satisfactory results even when employed in a concentration as low as 0.5% or less of the whole composition, where no intrinsic pharmaceutical effect of the MPG compound is expected.

The characteristics of the MPG compounds as the anticoloring agent for vitamin C resides not only in their prominent preventive effect as will be shown in tests, but also in their low toxicity, irrespective of whether orally administered or injected. When compared with thioglycolic acid, the MPG compounds are substantially nontoxic as shown below, for instance:

Acute toxicity ($LD_{50}$) in mice when tested intravenously

|  | Mg./kg. |
|---|---|
| α-MPG | 2,170 |
| Thioglycolic acid | 384 |
| Thioctic acid | 197 |
| Sodium metabisulfite | 151 |

Moreover, the MPG compounds do not show hemolytic action when injected.

Further characteristic of the MPG compounds is the applicability to a wide variety of vitamin C compositions. As will be shown in examples, the anticoloring effect of the MPG compounds is little affected by other coexisting ingredients in the composition. It is of course possible that each of the MPG compounds is used singly or in combination among them, and alos that they are used together with other anticoloring agent or agents as mentioned above.

TEST 1

25 g. of L-ascorbic acid, 12 g. of sodium hydrogencarbonae, 1.5 g. of benzyl alcohol and 0.2 g. of α-MPG were made up with distilled water to bring the total to 100 ml. This solution was pasteurized and dispensed into ampoules in the conventional manner. The air in the ampoules was replaced with nitrogen gas. Then, each ampoule was fused gas-tight for use in the following test.

The above samples were compared with control samples, in which the solution was free from the anticoloring agent but otherwise identical with the above-mentioned solution, for their relative absorbancy (E/cm.) at the wave length of 400 m$\mu$. The results are set forth in Table 1, which indicate that the additive of this invention has a clear anticoloring effect.

TABLE 1

| Anticoloring agent used | Degree of coloring (E/cm, 400 m$\mu$) | | | | |
|---|---|---|---|---|---|
|  | Freshly prepared | 40° C. | | 100° C. | |
|  |  | 50 days | 120 days | 0.5 hour | 1.5 hours |
| None | 0.015 | 0.092 | 0.258 | 0.144 | 0.480 |
| α-MPG, 0.4% | 0.015 | 0.022 | 0.091 | 0.018 | 0.059 |

TEST 2

30 g. of L-ascorbic acid, 1 g. of benzyl alcohol and 14.4 g. of sodium hydrogencarbonate were dissolved in distilled water to make the total 100 ml., and the resulting solution was used as the control. Test solutions were prepared by the addition of 0.3 g. of the respective test compounds as illustrated in Table 2. After being kept standing at 70° C. or 100° C. for the illustrated periods of time, each test solution was subjected to measurement of transmittance (T%) at the wave length of 400 m$\mu$ to give results as shown in Table 2.

TABLE 2

| | Temperature | | | | | |
|---|---|---|---|---|---|---|
| | 70° C. | | | | 100° C. | |
| Time, hours | 0 | 2 | 4 | 6 | 1 | 2 |
| Test compounds: | | | | | | |
| None (control) | 96.5 | 90.3 | 90.1 | 88.1 | 48.3 | 14.0 |
| α-MPG | 96.5 | 96.9 | 96.6 | 95.7 | 80.3 | 51.1 |
| β-MPG | 97.0 | 94.0 | 95.7 | 95.4 | 77.4 | 51.5 |
| α-MPGM | 95.0 | 96.0 | 95.6 | 95.9 | 75.8 | 46.8 |
| β-MPGM | 96.5 | 94.8 | 95.5 | 95.0 | 78.6 | 52.0 |
| α-AcMPG | 95.5 | 94.8 | 95.0 | 94.2 | 71.1 | 38.5 |
| α-ByMPG | 95.0 | 94.2 | 95.5 | 91.5 | 65.6 | 33.5 |

The result shows that each of MPG compounds has remarkable anticoloring effect, though α-MPG and β-MPG are the most eminent.

TEST 3

To each of the basic vitamin C solutions (A) and (B), there was added a test compound. Test solutions (A) were immediately kept standing under the illustrated conditions, while test solutions (B) were boiled for 30 minutes before being subjected to the illustrated conditions.

| | Percent | |
|---|---|---|
| | (A) | (B) |
| Basic vitamin C solutions: | | |
| L-Ascorbic acid | 26 | 26 |
| Sodium hydrogencarbonate | 1.24 | 1.24 |
| Benzyl alcohol | 1.0 | |
| Methyl p-hydroxybenzoate | | 0.13 |
| Test compounds: | | |
| (a) α-MPG | 0.4 | |
| (b) Thioglycolic acid | 0.1 | |
| (c) L-cysteine | 1.0 | |
| (d) Sodium metabisulfite ($Na_2S_2O_5$) | 0.05 | |
| (e) L-methionine | 1.0 | |

After being kept standing under the illustrated conditions, respective test solutions were subjected to measurement of transmittance (T%) at the wavelength of 400 m$\mu$. Results are shown in Table 3, which indicate that MPG is eminent in the anticoloring effect.

TABLE 3

| | | Test solution | | | | | | |
|---|---|---|---|---|---|---|---|---|
| | | (A) | | | | (B) | | |
| | | Test compound | | | | Test compound | | |
| Temperature (° C.) | Time, days | (a) | (b) | (c) | (e) | (a) | (b) | (c) | (d) |
| 40 | 0 | 98 | 96 | 95 | 97 | 93 | 87 | 85 | 90 |
| | 20 | 99 | 94 | 90 | 83 | 93 | 83 | 79 | 84 |
| | 40 | 98 | 81 | 79 | 76 | 93 | 66 | 62 | 82 |
| | 100 | 95 | | | 40 | 88 | | | 47 |
| 50 | 10 | 94 | 95 | 89 | 58 | 89 | 82 | 79 | 62 |
| | 20 | 89 | 90 | 86 | 33 | 80 | 79 | 74 | 36 |
| | 30 | 79 | | | 5 | 66 | | | 13 |
| 60 | 4 | 95 | 91 | 88 | 59 | 90 | 68 | 62 | 63 |
| | 8 | 85 | | | 20 | 79 | | | 27 |
| | 12 | 74 | | | 0 | 65 | | | 8 |
| 100 | ¹0.5 | 95 | 90 | 87 | 73 | 97 | 79 | 76 | 85 |
| | 1.0 | 89 | 81 | 75 | 53 | 90 | 68 | 65 | 68 |
| | ¹1.5 | 80 | 71 | 65 | 30 | 82 | 59 | 56 | 47 |

¹ Hours.

The present invention is further explained by way of the following examples which are not to be construed as limitative but are solely for the purpose of illustration. In the examples as well as in the preceding tests, all percentages are on the basis of weight unless otherwise noted, and the abbreviations "g.," "mg.," "ml.," "m$\mu$" and "IU" mean "gram(s)," "milligram(s)," "milliliter(s)," "millimicrons" and "international units," respectively.

EXAMPLE 1 (SOLUTION FOR INTERNAL USE)

A solution was prepared from the ingredients:

| | Mg. |
|---|---|
| Thiamine chloride hydrochloride | 2 |
| Riboflavin monophosphate | 3 |
| Pyridoxine hydrochloride | 5 |
| Dexpanthenol | 5 |
| Refined sucrose | 200 |
| Sodium cyclamate | 5 |
| Citric acid | 10 |
| L-ascorbic acid | 100 |
| Antiseptics* | 1.2 |
| Perfume | Trace |
| Water: to make 1 ml. | |

(The antiseptic with the asterisk in this specification means a mixture of methyl p-hydroxybenzoate and propyl p-hydroxybenzoate at the ratio of 5:1), and the solution was used as the control. Test solution was prepared by the addition of 5 mg. of α-MPG to 1 ml. of the solution. Both solutions were kept standing at 40° C. for 2 months, whereupon the control solution colored yellowish brown while the test solution remained unchanged in color with substantially no decomposition of the ingredients. Transmittance (T%) at 400 m$\mu$ of respective solutions are as follows: Initial: T=89.3%. After standing: Control, T=31.2%; test solution, T=86.3.

EXAMPLE 2 (SOLUTION FOR EXTERNAL USE)

A solution was prepared from the ingredients:

| | G. |
|---|---|
| Glycerol | 1.9 |
| D-sorbitol | 1.5 |
| Ethanol | 20.0 |
| Borax | 2.0 |
| Hydrochloric acid (1%) | 0.2 |
| Pyridoxine | 0.002 |
| L-Ascorbic acid | 0.1 |
| Antiseptics* | 0.12 |
| Perfume | Trace |
| Water: to make 100 ml. | | and was used as the control (Initial T=97.2%, 400 mµ). Test solution was prepared by the addition of 50 mg. of α-MPG to 100 ml. of the solution. Both solutions were kept standing at 35° C. for 4 months, whereupon the control turned yellowish brown while the test solution remained unchanged, each showing the transmittance at 400 mµ: Control: T=52.8%. Test solution: T=92.1%.

EXAMPLE 3 (SUSPENSION FOR INTERNAL USE)

| | Mg. |
|---|---|
| Chlorpheniramine maleate | 0.05 |
| dl-methylephedrine hydrochloride | 0.5 |
| Caffeine | 1.5 |
| Dibenzoylthiamine | 0.5 |
| Aminopyrine | 5.0 |
| L-ascorbic acid | 75 |
| Yellow pigment | 0.005 |
| Refined sucrose | 300 |
| Antiseptic* | 0.12 |
| Glycerol | 50 |
| Carboxymethylcellulose sodium | 5.0 |
| Citric acid | 2.0 |
| Sodium citrate | 0.4 |
| Water: to make 1 ml. | |

A suspension was prepared from the above ingredients and was used as the control. Test suspension was prepared by the addition of 3 mg. of α-MPG to another 1 ml.-portion of the suspension. Both suspensions were kept standing at 50° C. for a month, whereupon the control colored yellowish brown while the test suspension remained yellow with no substantial change of the ingredients.

EXAMPLE 4 (SUSPENSION FOR EXTERNAL USE)

| | G. |
|---|---|
| Kaolin | 20 |
| Pectin | 5 |
| Glycerol | 5 |
| L-ascorbic acid | 10 |
| Antiseptics* | 0.12 |
| Perfume | Trace |
| Water: to make 100 ml. | |

A suspension was prepared from the above ingredients and was used as the control. Test suspension was prepared by the addition of 0.6 g. of α-MPG to another 100 ml.-portion of the suspension. Both suspensions were kept standing at 45° C. for 3 months, whereupon the control colored brown, while the test suspension remained unchanged in color with no substantial decomposition of the ingredients.

EXAMPLE 5 (EMULSION FOR INTERNAL USE)

| | | |
|---|---|---|
| Vitamin A palmitate | IU | 500,000 |
| Vitamin D$_2$ | IU | 50,000 |
| Vitamin B$_1$ hydrochloride | g | 0.3 |
| Riboflavin monophosphate | g | 0.2 |
| L-ascorbic acid | g | 20 |
| Span 60 | g | 3.0 |
| Polysorbate 80 | g | 2.0 |
| Citric acid | g | 0.3 |
| Antiseptics* | g | 0.12 |
| Perfume | | Trace |
| Water: to make 100 ml. | | |

An emulsion was prepared from the above ingredients and was used as the control. Test emulsion was prepared by the addition of 0.3 g. of α-MPG to another portion of the emulsion. Both emulsions were kept standing at 30° C. for 5 months, whereupon the control turned pale yellowish brown, while the test emulsion remained substantially unchanged in color and the composition of the ingredients.

EXAMPLE 6 (EMULSION FOR EXTERNAL USE)

| | G. |
|---|---|
| White petrolatum | 25 |
| Stearyl alcohol | 25 |
| Propylene glycol | 12 |
| Sodium lauryl sulfate | 1 |
| L-ascorbic acid | 3 |
| Antiseptics* | 0.12 |
| Perfume | Trace |
| Water: to make 100 ml. | |

A hand cream was prepared from said ingredients and was used as the control. Test cream emulsion was prepared by the addition of 0.2 g. of α-MPG to another 100 ml. portion of said cream. Both creams were kept standing at 40° C. for a month, whereupon emulsions were not destroyed in both creams, but the control colored yellowish brown while the test emulsion remained substantially white with no change in physicochemical properties.

EXAMPLE 7 (AEROSOL FOR ASTHMA)

| | G. |
|---|---|
| Isoproterenol hydrochloride | 0.25 |
| L-ascorbic acid | 0.3 |
| Absolute ethanol | 33.0 |
| Difluorodichloromethane | 33.0 |
| Trichloromonofluoromethane | 33.0 |
| Distilled water | 1.5 |

An aerosol was prepared from said ingredients and used as the control. Test composition was prepared by the addition of 0.1 g. of α-MPG to another portion of the aerosol. Both aerosols were kept standing at 45° C. for a month, whereupon the control colored yellowish brown, while the test aerosol remained substantially unchanged in color and ingredients.

EXAMPLE 8 (JUICE)

| | | |
|---|---|---|
| L-ascorbic acid | g | 0.5 |
| Vitamin P complex (Bioflavonoids) | g | 0.05 |
| Vitamin A palmitate | IU | 5,000 |
| Fruit extract | g | 10 |
| Corn syrup | g | 20 |
| Yellow pigment | g | 0.02 |
| Citric acid | g | 0.3 |
| Antiseptics* | g | 0.12 |
| Perfume | | Trace |
| Water: to make 100 ml. | | |

A juice was prepared from said components and used for the control. Test sample of juice was prepared by the addition of 0.2 g. of α-MPG to another 100 ml.-portion of the juice. Both juices were kept standing at 35° C. for 3 months, whereupon the control turned brownish, while the test sample remained substantially unchanged.

EXAMPLE 9 (TABLETS)

Tablets were prepared from the ingredients (per tablet):

| | Mg. |
|---|---|
| L-Ascorbic acid | 50 |
| Cornstarch | 45 |
| Talc | 6 |
| Lactose, to make 200. | | and were used as the control. Test tablets were prepared from the same ingredients plus 0.5 mg., 1 mg. or 4 mg. of α-MPG. Respective kinds of tablets were allowed to stand at 60° C. or 40° C. in relative humidity 82% for 5 days, whereupon those for control colored pale yellowish brown while the test tablets remained unchanged with no decomposition of the L-ascorbic acid contained.

What is claimed is:

1. A method for preventing coloring of vitamin C compositions, which comprises incorporating an effective amount of an anti-coloring agent selected from the group consisting of a compound of the formula

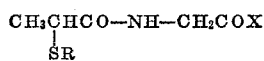

a compound of the formula

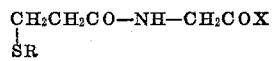

and mixtures thereof wherein R is H, acetyl or benzoyl and X is —OH or —NH$_2$, into a composition containing vitamin C.

2. The method according to claim 1, wherein the amount of the mercaptopropionylglycine is from about 0.001% to about 10% by weight relative to the whole composition and from about 0.1% to about 200% relative to the vitamin C.

3. The method according to claim 2, wherein the amount of the mercaptopropionylglycine is from about 0.4% to about 20% relative to the vitamin C.

4. The method according to claim 2, wherein the amount of the mercaptopropionylglycine is from about 0.05% to about 0.5% relative to the whole composition.

5. The method according to claim 1, wherein the vitamin C containing composition is an aqueous solution.

6. The method according to claim 1, wherein the vitamin C containing composition is a tablet.

7. The method according to claim 1, wherein the anti-coloring agent is α-mercaptopropionylglycine.

8. The method according to claim 1, wherein the anti-coloring agent is β-mercaptopropionylglycine.

9. The method according to claim 1, wherein the anti-coloring agent is α-mercaptopropionylglycineamide.

10. The method according to claim 1, wherein the anti-coloring agent is β-mercaptopropionylglycineamide.

11. The method according to claim 1, wherein the anti-coloring agent is α-acetylthiopropionylglycine.

12. The method according to claim 1, wherein the anti-coloring agent is α-benzoylthiopropionylglycine.

13. A composition, consisting essentially of (1) vitamin C, (2) an anti-coloring agent selected from the group consisting of a compound of the formula

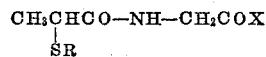

a compound of the formula

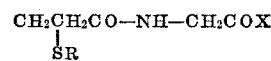

and mixtures thereof, wherein R stands for H, acetyl or benzoyl and X stands for —OH or —NH$_2$, and (3) a carrier selected from the group consisting of pharmaceutical carriers, cosmetic carriers and foodstuffs; the amount of said anti-coloring agent being from about 0.001% to 10% by weight relative to the whole composition and being from about 0.1% to about 200% relative to the vitamin C.

14. The composition according to claim 13, wherein the vitamin C is in a form of an aqueous pharmaceutical solution.

15. The composition according to claim 13, wherein the composition is a tablet.

16. The composition according to claim 13, wherein the anti-coloring agent is α-mercaptopropionylglycine.

17. The composition according to claim 13, wherein the anti-coloring agent is β-mercaptopropionylglycine.

18. The composition according to claim 13, wherein the anti-coloring agent is α - mercaptopropionylglycineamide.

19. The composition according to claim 13, wherein the anti-coloring agent is β - mercaptopropionylglycineamide.

20. The composition according to claim 13, wherein the anti-coloring agent is α-acetylthiopropionylglycine.

21. The composition according to claim 13, wherein the anti-coloring agent is α-benzoylthiopropionylglycine.

22. The composition according to claim 13, wherein the amount of the mercaptopropionylglycine is from about 0.4% to about 20% by weight relative to the vitamin C.

23. The composition according to claim 13, wherein the amount of the mercaptopropionylglycine is from about 0.05% to about 0.5% by weight relative to the whole composition.

References Cited

UNITED STATES PATENTS

| | | | |
|---|---|---|---|
| 2,585,580 | 2/1952 | Opplt | 424—175 |
| 2,694,719 | 11/1954 | Opplt | 424—280 |
| 2,904,471 | 9/1959 | Koehl, Jr. | 424—175 |
| 3,132,154 | 5/1964 | Meyer-Döring | 424—280 |
| 3,246,025 | 4/1966 | Mita et al. | 260—455 |

FOREIGN PATENTS

| | | | |
|---|---|---|---|
| 689,449 | 6/1964 | Canada | 424—175 |

ALBERT T. MEYERS, Primary Examiner

F. E. WADDELL, Assistant Examiner

U.S. Cl. X.R.

99—2; 424—280

UNITED STATES PATENT OFFICE
CERTIFICATE OF CORRECTION

Patent No. 3,781,423  Dated December 25, 1973

Inventor(s) Katsuo AOKI, Kozo YATANI, Eishi KOMETANI and Seiji IZUHARA

It is certified that error appears in the above-identified patent and that said Letters Patent are hereby corrected as shown below:

Column 1, immediately following the title, correct the spelling of the first inventor's name from AOKA to --AOKI--.

Signed and sealed this 17th day of September 1974.

(SEAL)
Attest:

McCOY M. GIBSON JR.
Attesting Officer

C. MARSHALL DANN
Commissioner of Patents